United States Patent
Koshijima (10) Patent No.: US 12,196,124 B2
(45) Date of Patent: Jan. 14, 2025

(54) VEHICULAR COOLING SYSTEM

(71) Applicant: NISSAN MOTOR CO., LTD., Yokohama (JP)

(72) Inventor: Masashi Koshijima, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 189 days.

(21) Appl. No.: 17/789,933

(22) PCT Filed: Dec. 30, 2019

(86) PCT No.: PCT/IB2019/001417
§ 371 (c)(1),
(2) Date: Jun. 29, 2022

(87) PCT Pub. No.: WO2021/136953
PCT Pub. Date: Jul. 8, 2021

(65) Prior Publication Data
US 2023/0043087 A1  Feb. 9, 2023

(51) Int. Cl.
*F02B 29/04* (2006.01)
*B60H 1/00* (2006.01)
(Continued)

(52) U.S. Cl.
CPC ......... *F02B 29/0462* (2013.01); *B60H 1/004* (2013.01); *B60H 1/3208* (2013.01);
(Continued)

(58) Field of Classification Search
CPC .. F02B 29/0462; F02B 29/0437; B60H 1/004; B60H 1/3208; B60H 1/3227; B60K 11/04; B60K 11/02; B60K 2001/003; B60K 17/354; B60K 17/356; B60K 1/00; B60K 6/46; B60K 6/52; B60L 15/20; B60W 2520/10; B60W 2520/105; B60W 2540/10; B60W 2540/103; B60W 2710/30; B60W 2710/305; B60W 10/06; B60W 10/08; B60W 10/30; B60W 20/19;
(Continued)

(56) References Cited

U.S. PATENT DOCUMENTS

2016/0114652 A1  4/2016  Izumi et al.
2019/0118610 A1*  4/2019  Johnston ................ B60H 1/143

FOREIGN PATENT DOCUMENTS

JP  60-082542 U  6/1985
JP  2006-298042 A  11/2006
(Continued)

*Primary Examiner* — Grant Moubry
*Assistant Examiner* — Ruben Picon-Feliciano
(74) *Attorney, Agent, or Firm* — Foley & Lardner LLP (57) ABSTRACT

A series-hybrid vehicle includes an internal combustion engine for electric power generation and a motor generator for travelling. The internal combustion engine is cooled by a second coolant water circuit that has a main radiator. A first coolant water circuit having a sub radiator is used to cool a front wheel-side power train cooling part, a rear wheel-side power train cooling part, a water-cooled condenser, and a low temperature-side intercooler. When the vehicle is accelerating, an electrical compressor for an air conditioner comes to a stop, and the circulation of refrigerant to the water-cooled condenser is brought to a halt.

3 Claims, 6 Drawing Sheets

(51) Int. Cl.
*B60H 1/32* (2006.01)
*B60K 11/04* (2006.01)
*B60L 15/20* (2006.01)

(52) U.S. Cl.
CPC ............ *B60H 1/3227* (2013.01); *B60K 11/04* (2013.01); *B60L 15/20* (2013.01)

(58) Field of Classification Search
CPC ...... B60Y 2400/204; Y02T 10/12; F01P 3/18; F01P 7/10; F01P 3/02; F01P 2060/02
See application file for complete search history.

(56) References Cited

FOREIGN PATENT DOCUMENTS

| | | | |
|---|---|---|---|
| JP | 2010-090729 A | 4/2010 | |
| JP | 2016-084121 A | 5/2016 | |
| WO | WO-2017/061438 A1 | 4/2017 | |
| WO | WO-2018191410 A1 * | 10/2018 | ......... B60H 1/00378 |

* cited by examiner

VEHICULAR COOLING SYSTEM

TECHNICAL FIELD

The present invention relates to a vehicular cooling system structured to dissipate heat of a vehicle interior air conditioner via a radiator in a cooling water circuit, wherein the vehicle interior air conditioner includes a water-cooled condenser.

BACKGROUND ART

In general, a vehicle includes a vehicle interior air conditioner utilizing a refrigeration cycle of coolant, for cooling of a vehicle interior. In most cases, a vehicle employing an internal combustion engine as a drive source for traveling includes a compressor mechanically driven by the internal combustion engine, and an air-cooled condenser structured to perform heat exchange with outside air.

Patent Document 1 discloses an art for a vehicle including a vehicle interior air conditioner and an internal combustion engine as a traveling drive source, which serves to improve the vehicle in acceleration performance by releasing an electromagnetic clutch between an output shaft and a compressor of the internal combustion engine in order to reduce a load on the internal combustion engine, during acceleration due to depression of an accelerator pedal.

However, this art does not pay attention to a water temperature and a heat quantity in a cooling water circuit in case of employing a water-cooled condenser.

PRIOR ART DOCUMENT(S)

Patent Document(s)

Patent Document 1: JP 2006-298042 A

SUMMARY OF THE INVENTION

Problem(s) to be Solved by the Invention

According to one aspect of the present invention, a vehicular cooling system for a vehicle includes: a cooling device of water-cooled type structured to contribute to cooling of a drive source of the vehicle; a water-cooled condenser structured to cool coolant of a vehicle interior air conditioner of the vehicle; a first cooling-water circuit including the cooling device and the water-cooled condenser; a first radiator structured to perform heat exchange between outside air and first cooling water circulating in the first cooling-water circuit; and a control unit configured to suspend a flow of the coolant in the water-cooled condenser, in response to satisfaction of a predetermined vehicle acceleration condition.

The cooling device may be one such as a cooling system for an internal combustion engine serving as a vehicle drive source, a cooling system for a motor and an inverter of an electric vehicle, or a water-cooled intercooler for a supercharge engine.

The configuration to suspend the coolant flow in the water-cooled condenser in response to satisfaction of the predetermined vehicle acceleration condition serves to reduce an amount of heat transferred from the water-cooled condenser to the first cooling water in the first cooling-water circuit. This decreases a temperature of the first cooling water flowing into the cooling device, and improves a cooling efficiency of the cooling device, and thereby temporarily enhance an output of the drive source.

In case that the cooling device is a cooling system for an internal combustion engine, the decrease in temperature of the first cooling water contributes to reduction of knockings, lowering of an intake air temperature, etc., and thereby serves to improve the output. In case that the cooling device is a cooling system for a motor and an inverter of an electric vehicle, the decrease in temperature of the first cooling water serves to improve the motor in output. In case that the cooling device is a water-cooled intercooler for a supercharge engine, the decrease in temperature of the first cooling water serves to lower a temperature of intake air, and improve the output. Thus, the cooling device described above widely includes devices structured to produce beneficial effects on the output of the vehicle drive source by cooling effect.

MODE(S) FOR CARRYING OUT THE INVENTION

The following details an embodiment of the present invention with reference to the drawings. The following embodiment exemplifies a case of applying the present invention to a series hybrid vehicle: in particular, a series hybrid vehicle of four-wheel drive type structured to separately drive front wheels and rear wheels.

Figure 1:
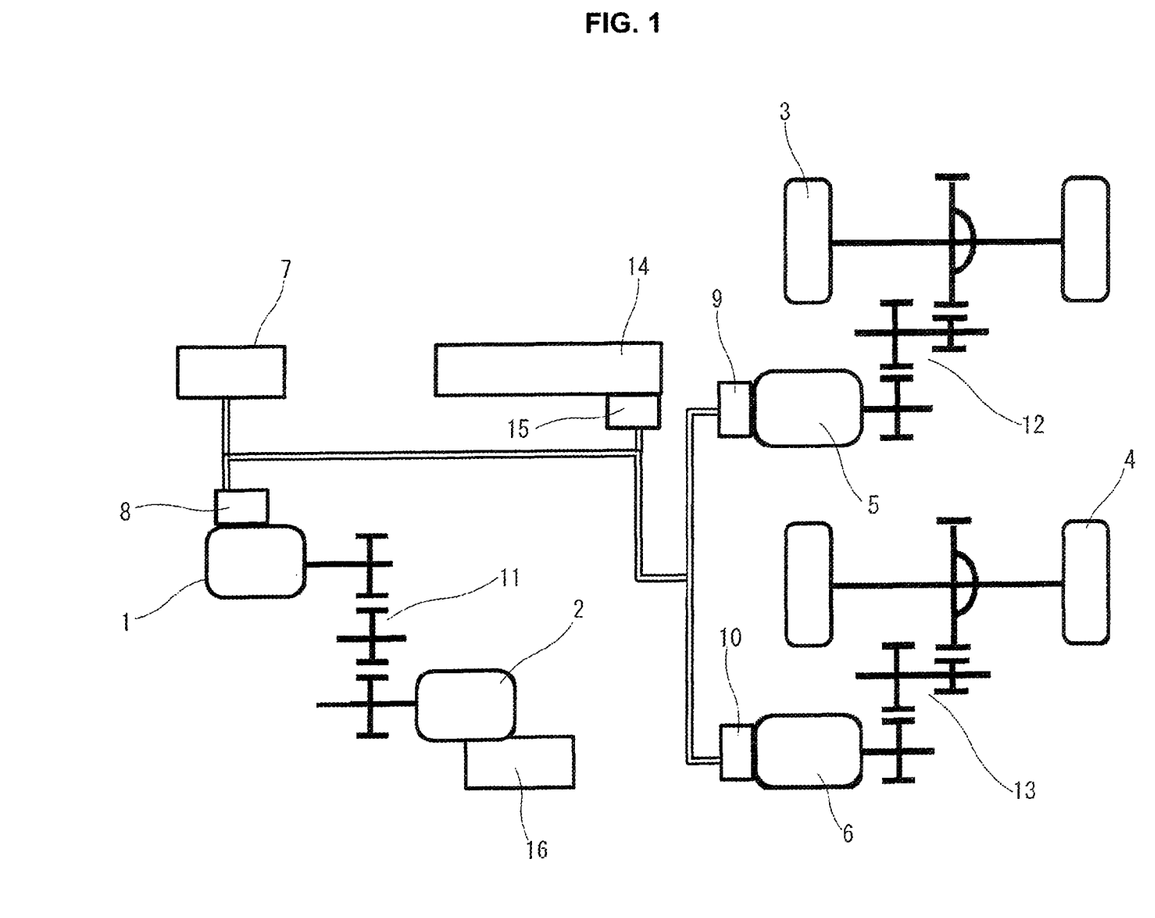
FIG. 1 is an explanatory diagram showing a drive system of a series hybrid vehicle including a cooling system according to an embodiment.

FIG. 1 shows a drive system of the series hybrid vehicle according to the embodiment. The series hybrid vehicle includes: a power-generation motor generator 1 that operates mainly as an electric power generator; an internal combustion engine 2 that operates as a power-generation internal combustion engine for driving the power-generation motor generator 1 in response to a request for electric power; a front wheel motor generator 5 that operates mainly as a motor, and drives front wheels 3; a rear wheel motor generator 6 that operates mainly as a motor, and drives rear wheels 4; and a battery 7 structured to temporarily store the generated electric power. The motor generators 1, 5, and 6 are respectively provided with inverter units 8, 9, and 10 each of which is structured to perform electric power conversion with battery 7. Each of the inverter units 8, 9, and 10 is substantially united with a corresponding one of the motor generators 1, 5, and 6. Internal combustion engine 2 is connected to power-generation motor generator 1 via a gear train 11. Front wheel motor generator 5 is structured to drive the front wheels 3 via a gear train 12 including a differential gear. Rear wheel motor generator 6 is structured to drive the rear wheels 4 via a gear train 13 including a differential gear. Battery 7 stores, via inverter unit 8, the electric power generated by power-generation motor generator 1 driven by internal combustion engine 2. Front wheel motor generator 5 and rear wheel motor generator 6 are driven with the electric power from battery 7, via inverter units 9 and 10 respectively. Battery 7 stores also electric power generated due to regeneration in front wheel motor generator 5 and rear wheel motor generator 6, via inverter units 9 and 10.

As shown in FIG. 1, the vehicle includes a vehicle interior air conditioner including an electric compressor 14 that is a compressor used in a refrigeration cycle. Electric compressor 14 is driven with the electric power from battery 7, via an inverter unit 15.

According to the embodiment of FIG. 1, front wheel motor generator 5 and rear wheel motor generator 6 serve as drive sources that directly drive the vehicle. Internal combustion engine 2 serves as an indirect drive source of the vehicle, because battery 7 is relatively small in capacity, and, in most situations, maximum outputs of front wheel motor generator 5 and rear wheel motor generator 6 depend on a generation amount of internal combustion engine 2 and power-generation motor generator 1. Internal combustion engine 2 includes a supercharger 16 such as a turbocharger or a mechanical supercharger.

The series hybrid vehicle according to the embodiment includes a cooling system using cooling water. The cooling system is composed of a first cooling-water circuit 21 shown in FIG. 2 and a second cooling-water circuit 22 shown in FIG. 3. Cooling water in first cooling-water circuit 21 (namely, first cooling water) is controlled to be basically lower in temperature than cooling water in second cooling-water circuit 22 (namely, second cooling water).

Figure 2:
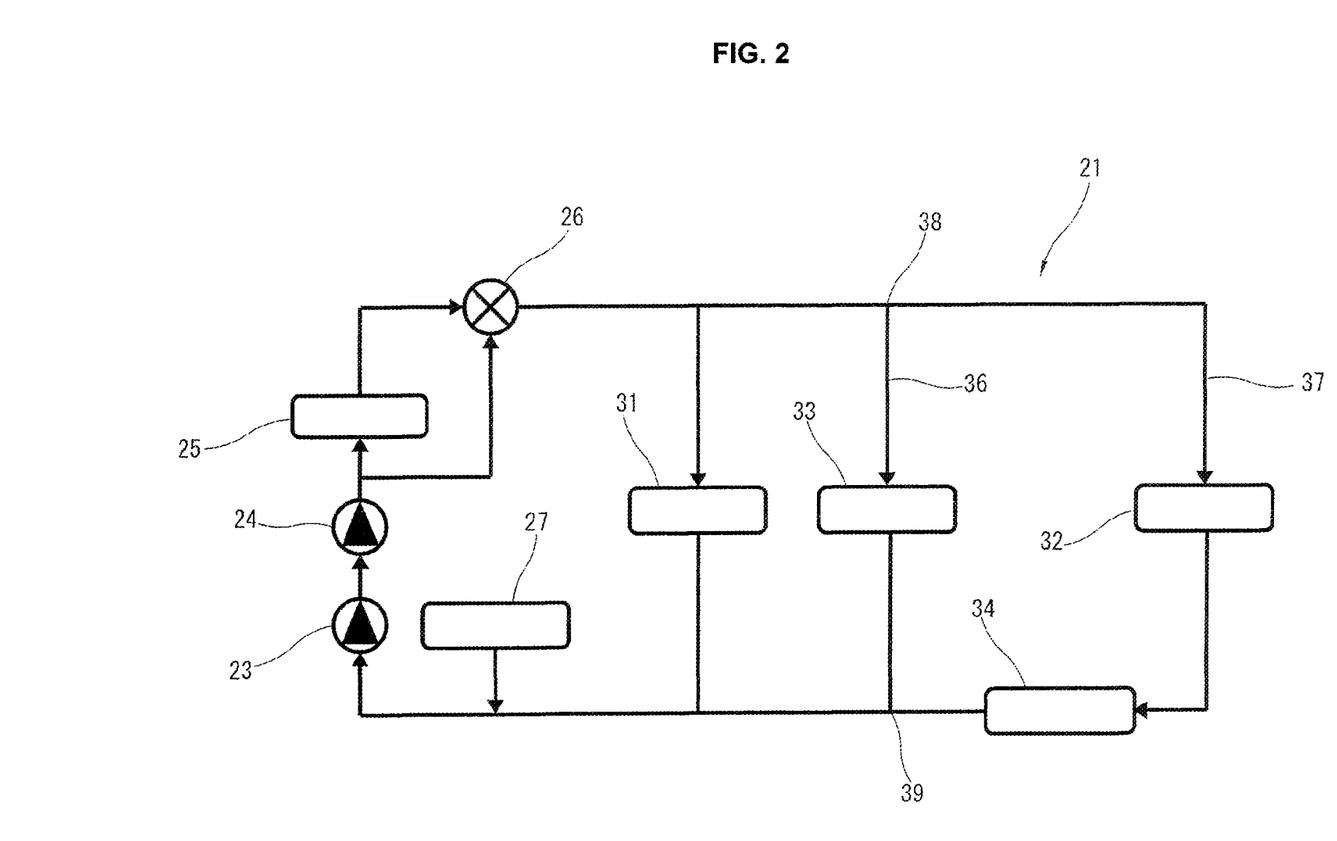
FIG. 2 is a circuit diagram of a first cooling-water circuit according to the embodiment.

As shown in FIG. 2, first cooling-water circuit 21 includes electric water pumps 23 and 24 arranged in two tiers. Electric water pumps 23 and 24 circulate the cooling water as shown by an arrow in FIG. 2. First cooling-water circuit 21 further includes an auxiliary radiator 25, a bypass valve 26, and a reservoir tank 27. Auxiliary radiator 25 is a heat dissipater disposed downstream with respect to electric water pumps 23 and 24, and performs heat exchange with outside air. Bypass valve 26 is disposed adjacently to an outlet (or an inlet) of auxiliary radiator 25. This allows the cooling water to bypass the auxiliary radiator 25, in case that the temperature of the cooling water is lower than a preset temperature (i.e., a preset temperature for first cooling-water circuit 21). Reservoir tank 27 is disposed upstream with respect to electric water pumps 23 and 24.

First cooling-water circuit 21 includes, as objects to be cooled, a front wheel powertrain cooler 31, a rear wheel powertrain cooler 32, a water-cooled condenser 33, and a low-temperature-side water-cooled intercooler 34. Front wheel powertrain cooler 31 is structured for cooling of front wheel motor generator 5 and inverter unit 9 accompanying it. Rear wheel powertrain cooler 32 is structured for cooling of rear wheel motor generator 6 and inverter unit 10 accompanying it. Water-cooled condenser 33 is structured to condense coolant in the refrigeration cycle of the vehicle interior air conditioner. Low-temperature-side water-cooled intercooler 34 is disposed in an intake system of internal combustion engine 2. Each of front wheel powertrain cooler 31 and rear wheel powertrain cooler 32 is configured as, for example, a cooling water passage running inside a housing containing the motor generator and the inverter unit.

Water-cooled condenser 33 is composed of, for example, a housing in which the cooling water flows and a core in which the coolant flows, wherein the core is contained in the housing, and the coolant is cooled due to heat exchange between the coolant in gas phase and the cooling water. Water-cooled condenser 33 includes a liquid tank (not shown) for temporary storing of the condensed coolant in liquid phase. Low-temperature-side water-cooled intercooler 34 is disposed in an intake passage between internal combustion engine 2 and supercharger 16, and is structured to perform heat exchange between the cooling water and supercharge intake air and thereby cool the supercharge intake air.

As shown in FIG. 2, the cooling water in first cooling-water circuit 21 flows in parallel in three passages: i.e., front wheel powertrain cooler 31, water-cooled condenser 33, and rear wheel powertrain cooler 32. Low-temperature-side water-cooled intercooler 34 is disposed downstream with respect to rear wheel powertrain cooler 32, so as to be connected to rear wheel powertrain cooler 32 in series in view of the flow of the cooling water. In other words, a flow passage 36 for water-cooled condenser 33 and a flow passage 37 for rear wheel powertrain cooler 32, which are in parallel, diverge at a bifurcation point 38 and converge at a confluence point 39, wherein low-temperature-side water-cooled intercooler 34 is disposed between rear wheel powertrain cooler 32 and confluence point 39. In the actual vehicle, rear wheel powertrain cooler 32 is disposed in a rear part of the vehicle, while auxiliary radiator 25 and front wheel powertrain cooler 31 are disposed in a front part of the vehicle. Accordingly, flow passage 37 extends toward the vehicle rear part, and passes low-temperature-side water-cooled intercooler 34 in the vehicle front part again, and then joins confluence point 39.

Figure 3:
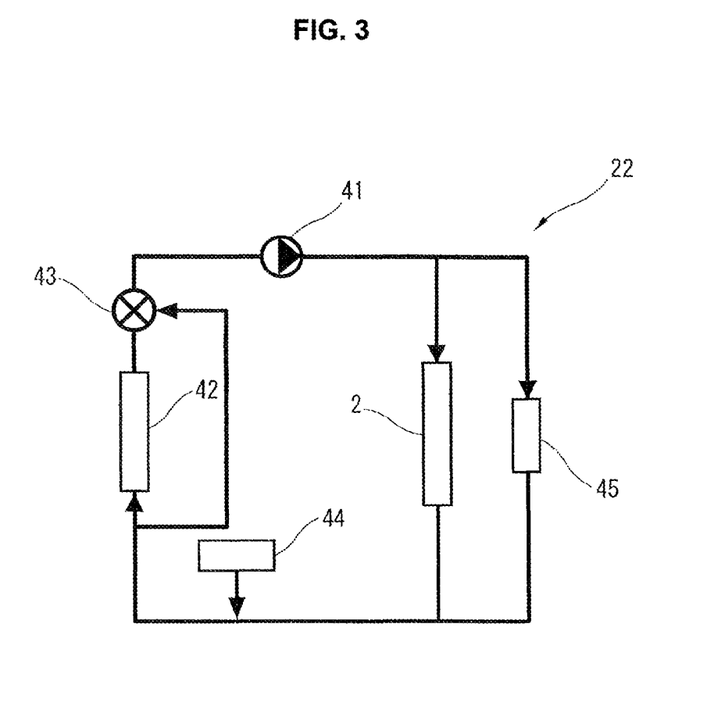
FIG. 3 is a circuit diagram of a second cooling-water circuit.

As shown in FIG. 3, second cooling-water circuit 22 includes a mechanical or electric water pump 41 driven with an output from internal combustion engine 2. Water pump 41 circulates the cooling water (i.e., the second cooling water) as shown by an arrow in FIG. 3. Second cooling-water circuit 22 further includes a main radiator 42, a bypass valve 43, and a reservoir tank 44. Main radiator 42 is a heat dissipater disposed upstream with respect to water pump 41, and performs heat exchange with outside air. Bypass valve 43 is disposed adjacently to an outlet (or an inlet) of main radiator 42. This allows the cooling water to bypass the main radiator 42, in case that the temperature of the cooling water is lower than a preset temperature (i.e., a preset temperature for second cooling-water circuit 22). Reservoir tank 44 is disposed upstream with respect to main radiator 42.

As described above, first cooling-water circuit 21 and second cooling-water circuit 22 are different from each other in cooling water temperature, and the cooling water in first cooling-water circuit 21 is lower in temperature than the cooling water in second cooling-water circuit 22. For example, the first cooling water flowing in first cooling-water circuit 21 is controlled to have a temperature of approximately 50 to 55° C. at the outlet of auxiliary radiator 25, while the second cooling water flowing in second cooling-water circuit 22 is controlled to have a temperature of approximately 70 to 90° C. under a target temperature of 80° C. at the outlet of main radiator 42.

As shown in FIG. 3, second cooling-water circuit 22 includes, as objects to be cooled, the internal combustion engine 2 and a high-temperature-side water-cooled intercooler 45 disposed in the intake system of internal combustion engine 2. Internal combustion engine 2 includes a water jacket for the cooling water, and is cooled mainly by the cooling water flowing in the water jacket.

High-temperature-side water-cooled intercooler 45 is disposed in the intake passage between internal combustion engine 2 and supercharger 16, adjacently to low-temperature-side water-cooled intercooler 34, and is structured to perform heat exchange between the cooling water and the supercharge intake air and thereby cool the supercharge intake air. In view of a flow direction of intake air in the intake passage, high-temperature-side water-cooled intercooler 45 is positioned relatively upstream, while low-temperature-side water-cooled intercooler 34 is positioned relatively downstream. For example, high-temperature-side water-cooled intercooler 45 and low-temperature-side water-cooled intercooler 34 may be configured as two cores arranged in series inside a housing in which the intake air flows, wherein the first cooling water and the second cooling water respectively flow in a corresponding one of the cores. For another example, each of high-temperature-side water-cooled intercooler 45 and low-temperature-side water-cooled intercooler 34 may be provided with an individual housing, independently from each other.

As described above, the second cooling water relatively high in temperature flows in high-temperature-side water-cooled intercooler 45, while the first cooling water maintained relatively low in temperature flows in low-temperature-side water-cooled intercooler 34. Accordingly, the supercharge intake air raised in temperature due to supercharging is cooled to a certain extent in high-temperature-side water-cooled intercooler 45 positioned upstream, and is further cooled in low-temperature-side water-cooled intercooler 34 positioned downstream. Thus, high-temperature-side water-cooled intercooler 45 and low-temperature-side water-cooled intercooler 34 compose a two-stage water-cooled intercooler. The first cooling water and the second cooling water may be same with each other or different from each other in components, concentration, etc. As one example, the first cooling water and the second cooling water may be ethylene glycol aqueous solutions containing appropriate additives.

Figure 4:
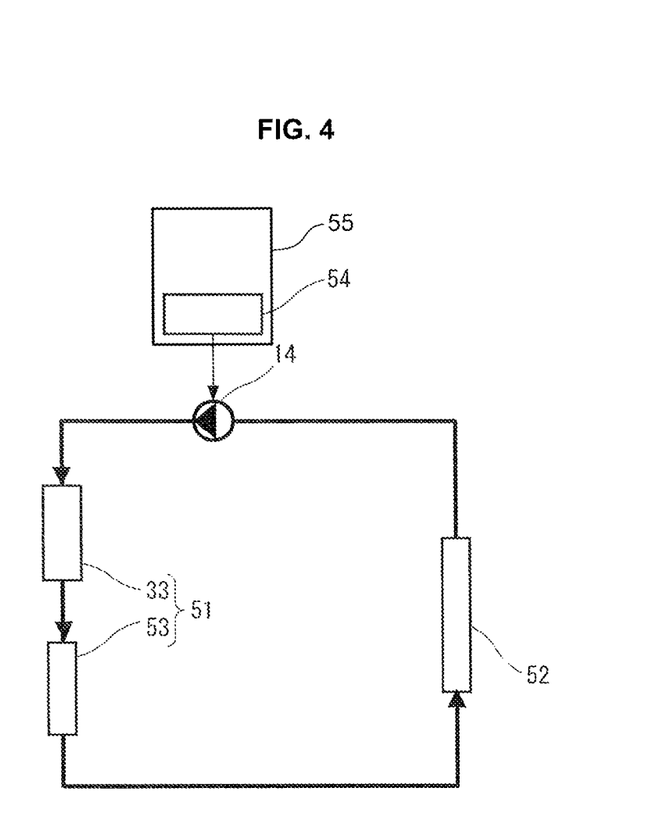
FIG. 4 is a circuit diagram of a coolant circuit of a vehicle interior air conditioner.

FIG. 4 schematically shows a coolant circuit for the vehicle interior air conditioner. The vehicle interior air conditioner includes the electric compressor 14, a condenser 51, and an evaporator 52. Electric compressor 14 described above is structured to compress the gas phase coolant. Condenser 51 is structured to cool and condense the gas phase coolant that has been raised in temperature and pressure due to the compression. Evaporator 52 includes an expansion valve structured to expand the liquefied coolant for cooling of the vehicle interior etc.

According to the embodiment, condenser 51 is composed of a combination of water-cooled condenser 33 described above and an air-cooled condenser 53 structured to perform heat exchange with outside air. In view of a flow of the coolant, water-cooled condenser 33 is disposed relatively upstream, where the compression of the coolant is performed mainly in water-cooled condenser 33. Air-cooled condenser 53 is disposed relatively downstream, where air-cooled condenser 53 serves as a subcooler for further subcooling of the liquefied coolant. Thus, air-cooled condenser 53 may be relatively small in size, because water-cooled condenser 33 bears a major part of a heat exchange amount required in condenser 51.

Electric compressor 14 is driven under control of an air conditioner controller 54 that is a part of a control unit 55. Air conditioner controller 54 is connected to an HEV controller (not shown) controlling a drive system for the entire vehicle and an engine controller (not shown) controlling the internal combustion engine 2, via communication such as CAN communication. As detailed below, air conditioner controller 54 is configured to suspend electric compressor 14 in response to a compressor suspension command sent from the HEV controller when the vehicle detects a predetermined acceleration request. In addition, also the HEV controller and the engine controller not shown are parts of the control unit 55.

Evaporator 52 is a so-called cold storage evaporator employing a cold storage material disposed adjacently to a coolant tube, and is structured to supply cold air to the vehicle interior for a certain time even after the suspension of electric compressor 14.

Figure 5:
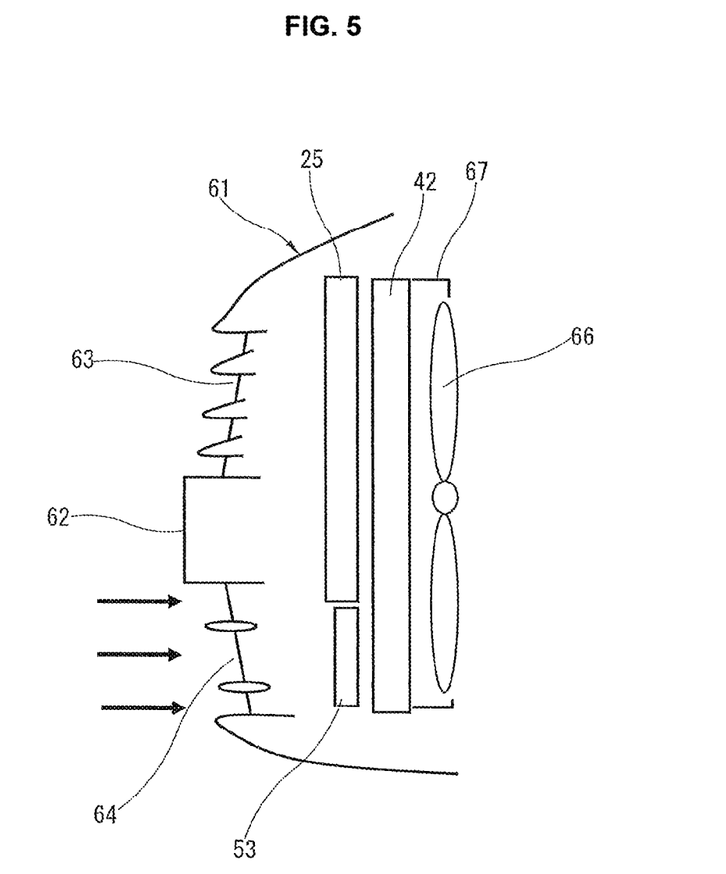
FIG. 5 is a schematic view showing arrangement of heat exchangers in a front part of the vehicle, when viewed from a lateral side of the vehicle.

Each of auxiliary radiator 25, main radiator 42, and air-cooled condenser 53 for heat exchange with outside air is disposed in the front part of the vehicle, so as to receive wind due to vehicle traveling. FIG. 5 shows how the three heat exchangers (i.e., main radiator 42, auxiliary radiator 25, and air-cooled condenser 53) are arranged in vehicle body 61. Vehicle body 61 includes a grille opening 63 disposed above a bumper 62 and a bumper opening 64 disposed below bumper 62, both for introduction of the vehicle traveling wind. Main radiator 42 is disposed behind both of grille opening 63 and bumper opening 64, so as to receive the vehicle traveling wind from both of these two openings 63 and 64. Air-cooled condenser 53 is disposed in front of main radiator 42, overlapping with a lower region of main radiator 42, so as to receive the vehicle traveling wind mainly from bumper opening 64. Auxiliary radiator 25 is disposed in front of main radiator 42, overlapping with an upper region of main radiator 42, so as to receive the vehicle traveling wind mainly from grille opening 63. Auxiliary radiator 25 and air-cooled condenser 53 are arranged in a vertical direction, along a plane parallel with main radiator 42. It is allowed to dispose auxiliary radiator 25 at a lower position and dispose air-cooled condenser 53 at an upper position. Behind main radiator 42, an electric fan 66 is disposed with a shroud 67. Electric fan 66 is structured to forcibly generate cooling wind in case of being insufficient in the vehicle traveling wind, such as a case of a low vehicle speed.

Figures 6A, 6B, 6C, 6D, 6E:
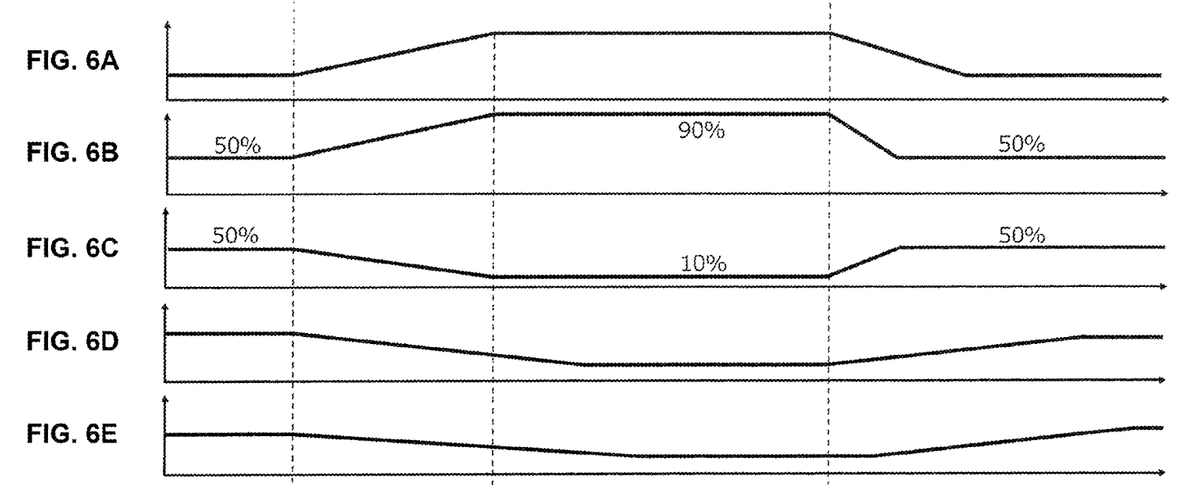
FIGS. 6A to 6H and 6J are time charts showing behavior of respective factors upon acceleration of the vehicle.
Figures 6F, 6G, 6H:
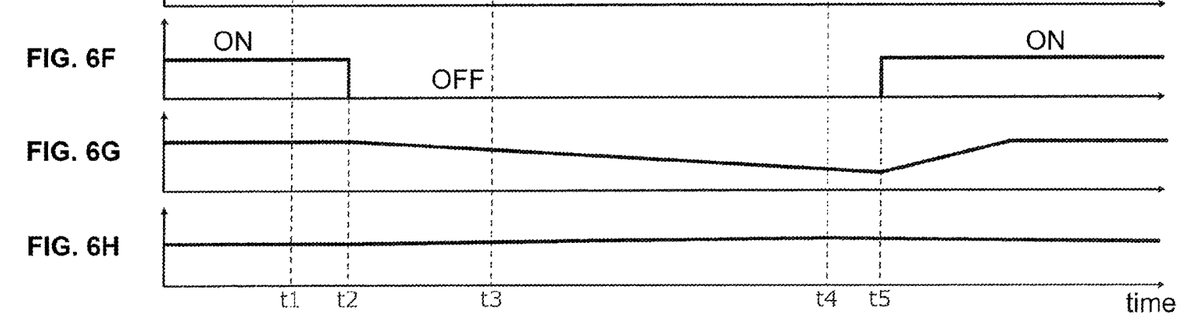

The following describes operation of the cooling system according to the above embodiment, with reference to time charts in FIGS. 6A to 6H and 6J. FIG. 6A shows behavior and change of an accelerator opening degree of the vehicle (i.e., a depression amount of the accelerator pedal). FIG. 6B shows behavior and change of a ratio in driving force exerted on front wheels 3. FIG. 6C shows behavior and change of a ratio in driving force exerted on rear wheels 4. FIG. 6D shows behavior and change of a water temperature at the inlet of low-temperature-side water-cooled intercooler 34. FIG. 6E shows behavior and change of an intake air temperature at an intake air inlet of internal combustion engine 2. FIG. 6F shows behavior and change of ON/OFF state of electric compressor 14. FIG. 6G shows behavior and change of a cold storage amount of evaporator 52. FIG. 6H shows behavior and change of a blowout air temperature at an outlet of the vehicle interior air conditioner in the vehicle interior.

Figure 6J:
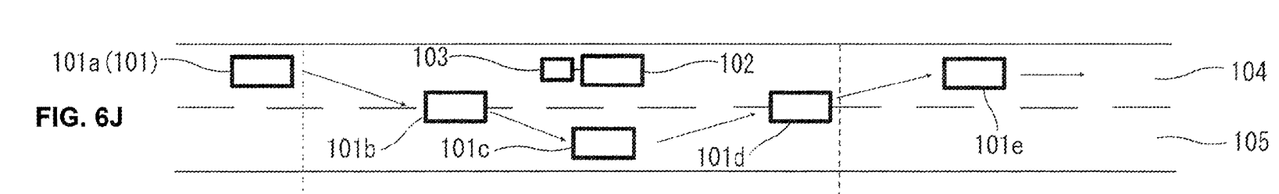

FIG. 6J at the top schematically shows how the vehicle travels, in which a subject vehicle 101 overtakes a preceding vehicle 102 on a two-lane road such as an express way. Preceding vehicle 102 travels relatively slowly in a traveling lane 104, while towing a towed vehicle 103. Each of reference numerals 101*a*, 101*b*, 101*c*, 101*d*, and 101*e* represents subject vehicle 101, which shows change in relative position of subject vehicle 101 with respect to preceding vehicle 102. Subject vehicle 101 (101*a*) that has been traveling behind preceding vehicle 102 moves to an overtaking lane 105 while accelerating due to depression of the accelerator pedal in order to overtake preceding vehicle 102, and then travels at a constant vehicle speed from around a timing of catch up with preceding vehicle 102, and overtakes preceding vehicle 102. Thereafter, subject vehicle 101 returns to the traveling lane 104 while decelerating. Thus, in view of positions of the subject vehicle shown in FIG. 6J, the subject vehicle is in an acceleration period at positions of 101a to 101c, and is in a constant speed period at positions of 101c to 101d, and is in a deceleration period at positions of 101d to 101e.

Such acceleration, overtaking, and deceleration of the vehicle are reflected in the behavior and the change shown in FIGS. 6A to 6H. In steady traveling at the initial stage, electric compressor 14 is ON, and the cold storage amount of evaporator 52 is at the maximum due to traveling so far. The driving force is borne by front wheels 3 and rear wheels 4 at an allotment ratio of, for example, 50:50.

At time instant t1, the acceleration starts due to increase in accelerator opening degree. After the start of the acceleration, at time instant t2 at which the accelerator opening degree exceeds a predetermined threshold, electric compressor 14 is turned OFF because a predetermined vehicle acceleration condition is determined to be satisfied. Electric compressor 14 is maintained OFF until time instant t5 at which the accelerator opening degree falls below the predetermined threshold after a start of the deceleration (i.e., decrease in accelerator opening degree) at time instant t4. At time instant t5, electric compressor 14 is turned ON again. In another manner, it is allowed to control the driving of electric compressor 14 to be restarted after a certain time period or a certain travel distance after the start of the acceleration.

In response to this suspension of electric compressor 14, the circulation of the coolant for the vehicle interior air conditioner is suspended: i.e., the coolant stops flowing in water-cooled condenser 33. This reduces an amount of heat provided from water-cooled condenser 33 to the first cooling water, while reducing also an amount of heat radiation from air-cooled condenser 53.

Thus, the suspension of the coolant circulation causes the refrigeration cycle to be substantially suspended. However, evaporator 52 being the cold storage evaporator serves to suppress the vehicle interior from rising in temperature as shown in FIG. 6H, by utilizing coldness stored in evaporator 52. Accordingly, the cold storage amount of evaporator 52 gradually decreases during the suspension of electric compressor 14. Thereafter, the cold storage is replenished again in response to the driving restart of electric compressor 14 at time instant t5.

As shown in FIG. 6D, the water temperature at the inlet of low-temperature-side water-cooled intercooler 34 in first cooling-water circuit 21 decreases due to the suspension of electric compressor 14 and the decrease in amount of heat dissipated from water-cooled condenser 33 to the first cooling water. Furthermore, the acceleration of the vehicle (i.e., increase in vehicle speed) increases the vehicle traveling wind, and thereby increases an amount of heat radiation from auxiliary radiator 25. This is another factor to decrease the water temperature at the inlet of low-temperature-side water-cooled intercooler 34.

As shown in FIG. 6E, the intake air temperature introduced to internal combustion engine 2 decreases with decrease in water temperature at the inlet of low-temperature-side water-cooled intercooler 34. This increases the output of internal combustion engine 2, and increases the amount of generation in power-generation motor generator 1, and thereby raises front wheel motor generator 5 and rear wheel motor generator 6 in acceleration performance.

The decrease in temperature of the first cooling water in first cooling-water circuit 21 serves to enhance front wheel powertrain cooler 31 and rear wheel powertrain cooler 32 in cooling performance, which contributes to improvement of front wheel motor generator 5 and rear wheel motor generator 6 in output. This serves to enhance the acceleration performance.

In view of electric power consumption, the suspension of electric compressor 14 serves to ensure electric power for front wheel motor generator 5 and rear wheel motor generator 6, and thereby improve them in output. This contributes to the enhancement of the acceleration performance.

In the example shown in the drawings, the allotment ratio of the driving force between front wheels 3 and rear wheels 4 is changed upon the acceleration, by the HEV controller that belongs to the control unit 55. Specifically, front wheels 3 increases and rear wheels 4 decreases in allotment ratio of the driving force in response to the acceleration, in order to reduce a heat load exerted on rear wheel powertrain cooler 32 that is disposed adjacently to and upstream with respect to low-temperature-side water-cooled intercooler 34 in first cooling-water circuit 21. In the example of the drawing, the allotment ratio is permitted to vary up to 90:10. Front wheels 3 gradually increases in allotment ratio of the driving force from 50% with increase in accelerator opening degree, while rear wheels 4 gradually decreases in allotment ratio of the driving force from 50%. The allotment ratio becomes 90:10 at time instant t3 at which the acceleration stops.

Such relative decrease in driving force borne by rear wheels 4 reduces an amount of heat dissipated from rear wheel powertrain cooler 32 to the first cooling water in first cooling-water circuit 21. This serves to suppress the water temperature at the inlet of low-temperature-side water-cooled intercooler 34 from rising in temperature, and contributes to the enhancement of the acceleration performance via the enhancement of the output of internal combustion engine 2. If the heat dissipation amount from rear wheel powertrain cooler 32 increased in response to the acceleration, the low-temperature-side water-cooled intercooler 34 would be deteriorated in cooling performance for the supercharge intake air due to rise in temperature of the first cooling water flowing into low-temperature-side water-cooled intercooler 34, because rear wheel powertrain cooler 32 is disposed immediately before low-temperature-side water-cooled intercooler 34 in first cooling-water circuit 21.

After the start of the deceleration (i.e., decrease in accelerator opening degree), the allotment ratio of the driving force between front wheels 3 and rear wheels 4 starts to gradually change toward 50:50 that is a default value for steady state.

Although the embodiment above exemplifies a case of applying the present invention to the four-wheel drive type series hybrid vehicle, the present invention is not limited to that, but may be variously modified.

The invention claimed is:

1. A vehicular cooling system for a hybrid vehicle structured to drive a generator with an internal combustion engine including a supercharger, and travel by driving a motor section with electric power generated in the generator, the vehicular cooling system comprising:
   a water-cooled intercooler structured to cool supercharge intake air supplied to the internal combustion engine;
   a water-cooled condenser structured to cool coolant of a vehicle interior air conditioner of the hybrid vehicle, wherein the vehicle interior air conditioner includes an electric compressor;
   a first cooling-water circuit including the water-cooled intercooler and the water-cooled condenser;

a first radiator structured to perform heat exchange between outside air and first cooling water circulating in the first cooling-water circuit; and a control unit configured to suspend a flow of the coolant in the water-cooled condenser by suspending the electric compressor, in response to satisfaction of a predetermined vehicle acceleration condition, wherein:

the motor section includes a first motor and a second motor, wherein the first motor drives one of front wheels and rear wheels, and the second motor drives the other of the front wheels and the rear wheels;

the first cooling-water circuit includes a second powertrain cooler structured to cool the second motor and an inverter unit joined to the second motor, wherein the second powertrain cooler is disposed upstream with respect to the water-cooled intercooler, adjacently to the water-cooled intercooler; and the control unit is configured to temporarily reduce an allotment of a driving force borne by the second motor, in addition to the suspension of the flow of the coolant, in response to satisfaction of the predetermined vehicle acceleration condition.

2. The vehicular cooling system as claimed in claim 1, wherein the vehicle interior air conditioner includes a cold-storage evaporator.

3. The vehicular cooling system as claimed in claim 1, the vehicular cooling system further comprising:

a second cooling-water circuit in which second cooling water circulates between a water jacket of the internal combustion engine and a second radiator.

* * * * *